(12) United States Patent
Bettencourt et al.

(10) Patent No.: US 8,162,372 B2
(45) Date of Patent: Apr. 24, 2012

(54) SEAT FOR ARMOURED VEHICLE

(75) Inventors: Benoit Bettencourt, Chaville (FR); Michel Godard, Vougy (FR); Bernard Sagory, Guyancourt (FR); Xavier Poirmeur, Guyancourt (FR)

(73) Assignee: Nexter Systems, Roanne (FR)

( * ) Notice: Subject to any disclaimer, the term of this patent is extended or adjusted under 35 U.S.C. 154(b) by 0 days.

(21) Appl. No.: 12/737,097

(22) PCT Filed: Jun. 10, 2009

(86) PCT No.: PCT/FR2009/000683
§ 371 (c)(1), (2), (4) Date: Dec. 8, 2010

(87) PCT Pub. No.: WO2010/000970
PCT Pub. Date: Jan. 7, 2010

(65) Prior Publication Data
US 2011/0074176 A1    Mar. 31, 2011

(30) Foreign Application Priority Data
Jun. 13, 2008 (FR) .................................... 08 03310

(51) Int. Cl.
*B60N 2/02* (2006.01)
*B60N 2/427* (2006.01)
(52) U.S. Cl. .................. 296/65.05; 296/65.02; 296/68.1
(58) Field of Classification Search ............... 296/65.05, 296/68.1, 65.02; 297/216.1, 216.15
See application file for complete search history.

(56) References Cited

U.S. PATENT DOCUMENTS

| | | | | |
|---|---|---|---|---|
| 2,796,112 | A * | 6/1957 | Barsky | 297/216.1 |
| 3,357,736 | A * | 12/1967 | McCarthy | 296/68.1 |
| 3,501,200 | A * | 3/1970 | Ohta | 297/452.19 |
| 4,349,167 | A * | 9/1982 | Reilly | 244/122 R |
| 5,125,598 | A | 6/1992 | Fox | 244/122 R |
| 5,273,240 | A | 12/1993 | Sharon | 244/122 R |
| 6,053,555 | A * | 4/2000 | Neale | 296/65.03 |
| 6,179,380 | B1 * | 1/2001 | Hoffman | 297/216.17 |
| 6,378,939 | B1 * | 4/2002 | Knoll et al. | 297/216.1 |
| 6,409,243 | B1 * | 6/2002 | Hansen | 296/68.1 |
| 6,582,015 | B2 * | 6/2003 | Jessup et al. | 297/216.17 |
| 6,585,190 | B2 * | 7/2003 | Mort | 244/122 R |

(Continued)

FOREIGN PATENT DOCUMENTS
DE    101 30 631    1/2003
(Continued)

*Primary Examiner* — Glenn Dayoan
*Assistant Examiner* — Gregory Blankenship
(74) *Attorney, Agent, or Firm* — Steptoe & Johnson LLP

(57) ABSTRACT

The invention relates to a seat (1) for an armored vehicle, incorporating a back rest (2) integral with a wall or the roof (4) of the vehicle and a sitting part (3) mounted able to pivot with respect to the back rest (2) between a folded position in which it is substantially parallel to the back rest (2) and an unfolded position where it is held by a limit stop and is substantially perpendicular to the back rest (2).
This seat is characterized in that the sitting part (3) is connected to the back rest (2) by linking means (6, 8) ensuring, in the event of a predetermined load, the release of the limit stop (8) of the sitting part (3) and its pivoting beyond the unfolded position.

4 Claims, 3 Drawing Sheets

U.S. PATENT DOCUMENTS

| | | | |
|---|---|---|---|
| 7,100,991 B2 | 9/2006 | Schroth | 297/468 |
| 7,270,045 B1 * | 9/2007 | Gonzalez | 89/36.02 |
| 7,293,818 B2 * | 11/2007 | Kumpf et al. | 296/68.1 |
| 7,513,558 B2 * | 4/2009 | Hansen | 296/68.1 |
| 7,618,076 B2 * | 11/2009 | Meynet et al. | 296/65.01 |
| 2010/0102602 A1 * | 4/2010 | Hansen | 297/216.1 |
| 2010/0109393 A1 * | 5/2010 | Hansen | 297/216.1 |
| 2010/0117408 A1 * | 5/2010 | Hansen | 297/216.1 |
| 2011/0074176 A1 * | 3/2011 | Bettencourt et al. | 296/64 |

FOREIGN PATENT DOCUMENTS

| | | |
|---|---|---|
| DE | 202 10 749 | 11/2003 |
| DE | 103 17 314 | 7/2004 |
| DE | 10 2004 048177 | 4/2006 |
| WO | WO98/00309 | 1/1998 |
| WO | WO03/004958 | 1/2003 |

* cited by examiner

SEAT FOR ARMOURED VEHICLE

This application is a national stage entry of International Application No. PCT/FR2009/000683, filed Jun. 10, 2009 designating the U.S., which claims the benefit of French Application No. 08.03310, filed Jun. 13, 2008.

TECHNICAL FIELD OF THE INVENTION

The technical scope of the invention is that of seats for vehicles and namely seats for armoured vehicles.

TECHNICAL BACKGROUND OF THE INVENTION

Armoured vehicles are brought into an operation zone where they are confronted with mines and IEDs (the acronym for "Improvised Explosive Devices"). These IEDs are home-made devices but which can implement substantial masses of explosive or other energetic materials (petrol, gas).

The impacts received by the structure, and in particular the floor, of the vehicles are considerable and generally when the seats of such a vehicle are being designed they are made to be isolated from the vehicle floor.

Patent WO9800309 thus proposes to provide a deformable structure between the floor and the seat, such structure absorbing part of the shock communicated by the floor.

Patent WO03004958 proposes to ensure the rupture of the link between the floor and the ground.

A more interesting solution implemented today consists in suspending the seat from the roof or from a side wall. The seat and floor are thus uncoupled.

However, the shocks received by the vehicle cab communicate an acceleration to the cab whose excessive rate may cause serious injuries.

DISCLOSURE OF THE INVENTION

The aim of the invention is to propose a seat for an armoured vehicle that is simple in structure and that ensures, nevertheless, an excellent level of protection with respect to the shocks received by the vehicle during the explosion of a mine or IED.

Thus, the invention relates to a seat for an armoured vehicle, incorporating a back rest integral with a wall or the roof of the vehicle and a sitting part mounted able to pivot with respect to the back rest between a folded position in which it is substantially parallel to the back rest and an unfolded position where it is held by a limit stop and is substantially perpendicular to the back rest, such seat wherein the sitting part is connected to the back rest by linking means ensuring, in the event of a predetermined load, the release of the limit stop of the sitting part and its pivoting beyond the unfolded position.

According to another characteristic, the sitting part is mounted able to pivot between two vertical supports, the linking means incorporating at least one protrusion, organ, or device forming a limit stop and cooperating with a stop surface integral with one of the supports, the profile of the protrusion or organ, the stop surface and the shape of the supports being selected so that the protrusion or organ causes a deformation of the support when a predetermined load is exerted on the sitting part.

The supports may be formed of metallic plates, the stop surface itself being formed by a rim fitted to a face of the plate that is facing the pivoting sitting part.

The plate may incorporate a profile such that a load of a certain level exerted on the sitting part causes the plate to deform distancing the rim from the limit stop.

The seat may comprise two protrusions or organs each cooperating with a stop surface of a vertical support.

DESCRIPTION OF THE DRAWINGS

The invention will become more apparent from the following description of a particular embodiment, such description being made with reference to the appended drawings, in which.

DETAILED DESCRIPTION OF THE INVENTION

Figure 1:
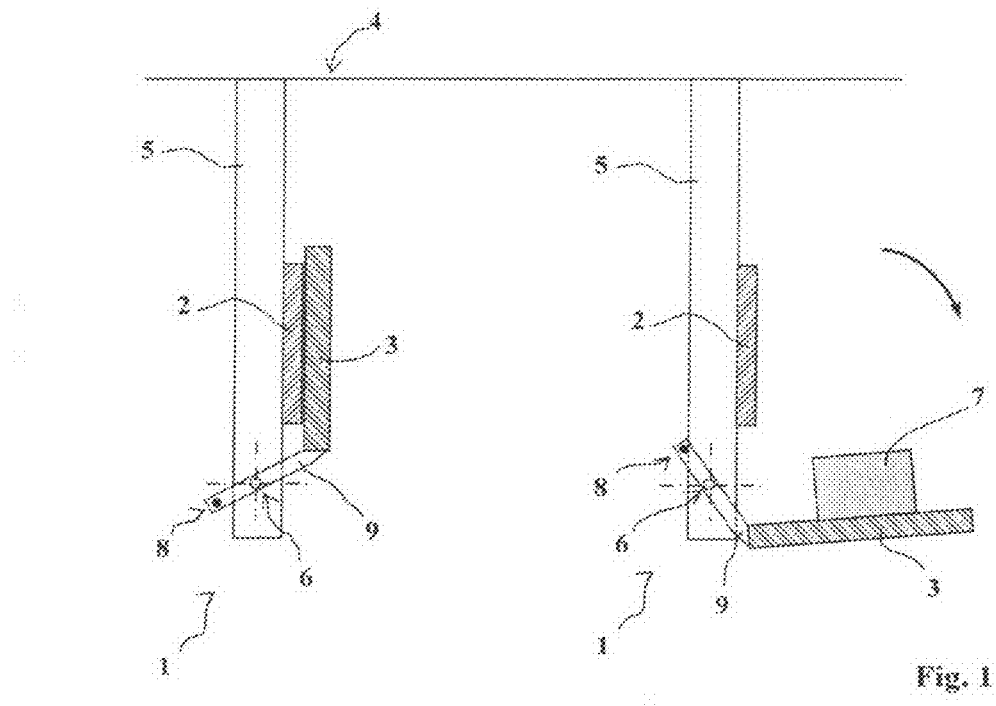
FIG. 1 shows a side view of a seat according to one embodiment of the invention, the view is a section along the plane referenced AA in FIG. 2, the right part of the Figure showing the seat in its unfolded position and the left part showing the same seat in its folded position.
Figure 2:
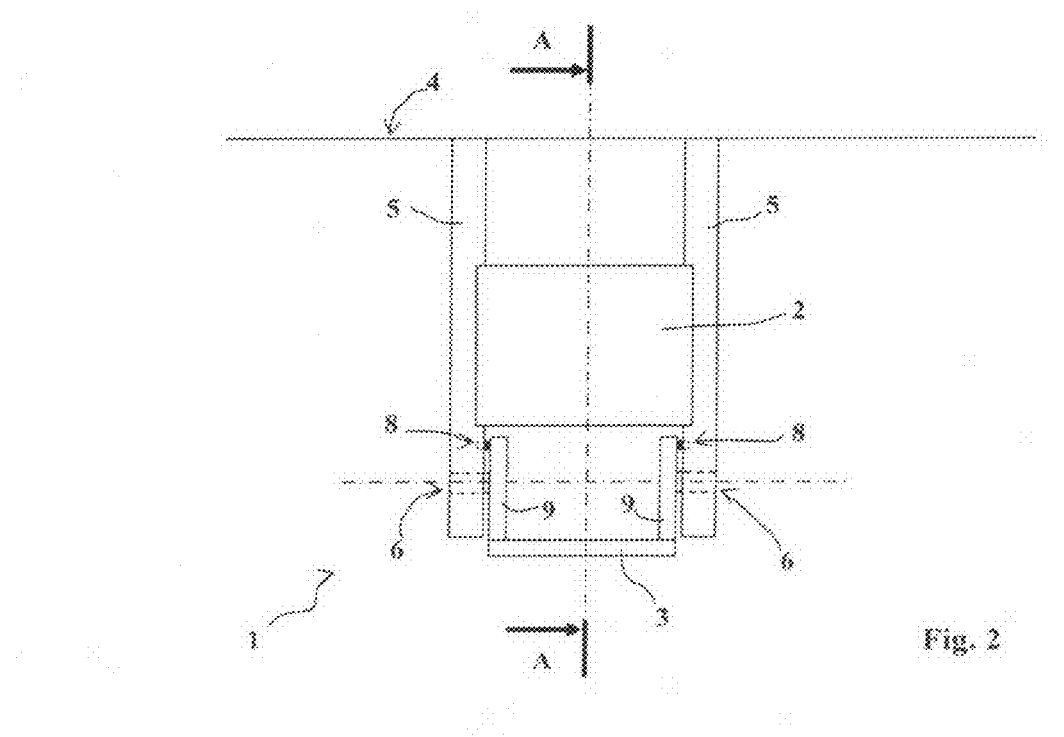
FIG. 2 is a front view of this same seat in its unfolded position.

With reference to FIG. 1, a seat 1 for an armoured vehicle incorporates a back rest 2 and a sitting part 3. The back rest 2 is made integral with the roof 4 of the cab of a vehicle by means of two vertical supports 5 parallel to each other. The back rest 2 may just as well be made integral with a side wall of this cab using appropriate support structures.

The sitting part 3 is mounted able to pivot with respect to supports 5 (and thus also with respect to the back rest 3 that is fastened to the supports) by means of pivots 6.

The sitting part 3 can thus move from a folded position (left part of FIG. 1) in which it is substantially parallel to the back rest 2 into an unfolded position (right part of FIG. 1) in which it is substantially perpendicular to the back rest. Spring means (not shown) may be provided to bring the sitting part, in the absence of a load 7, back into the folded position.

The pivoting of the sitting part 3 is stopped by two limit stops 8 that are integral with arms 9 attached to the sitting part and which also carry the pivots 6.

According to this first embodiment, the limit stops 8 come into contact with a rear face of the supports 5. These limit stops may be constituted by steel cylindrical rods that have a spherical end. The profile of the rod will be selected so as to be able to deform the support 5 for a load predetermined by calculation during the design of the seat.

Figure 3:
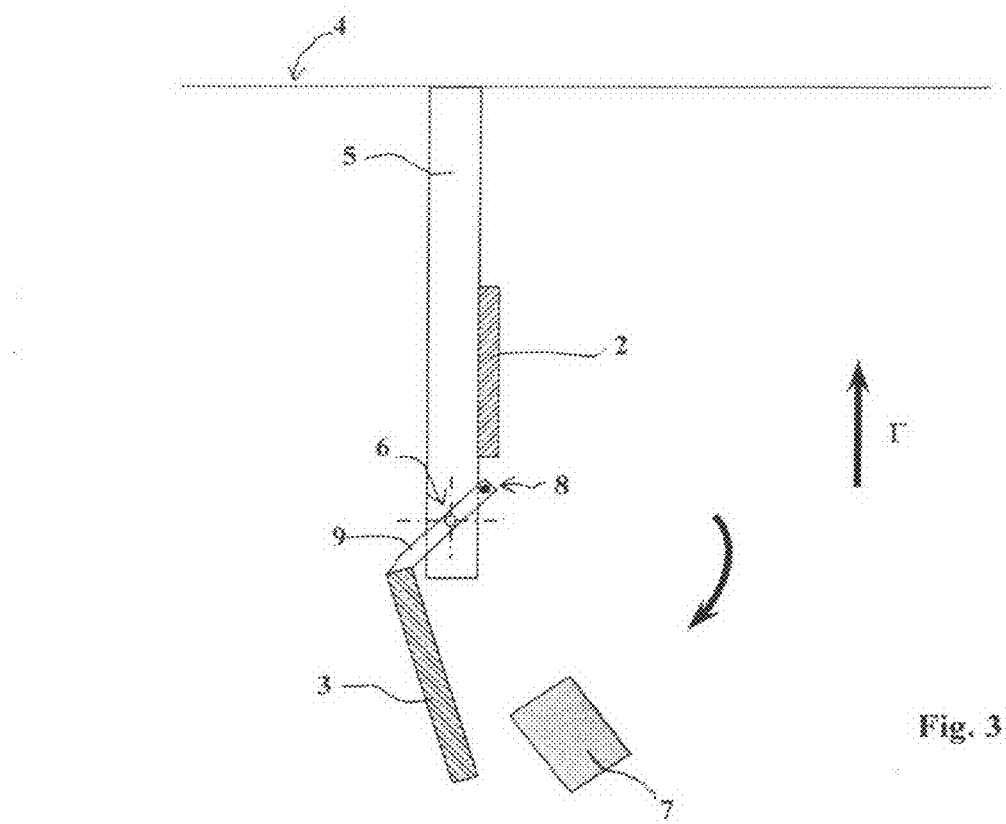
FIG. 3 shows how the seat behaves in the event of a shock.

FIG. 3 shows the seat according to the invention when an acceleration $\Gamma$ of a substantial rate is communicated to the vehicle cab by the explosion of a mine or an IED.

The person occupying the seat is thus subjected to a load opposing $\Gamma$ at a very high level. This load is communicated to the limit stops 8 by the sitting part 3. The length of the limit stops and their profile, which may be rounded, enables the supports 5 to be deformed and thus enables the limit stops 8 to be exceeded and the sitting part 3 to pivot beyond its unfolded position. The person occupying the seat is thus no longer subjected to a shock of a higher level than that needed to release the limit stops 8 of the chair. The person falls onto the cab floor but after the critical moment when the loads are at their highest.

Figure 4:
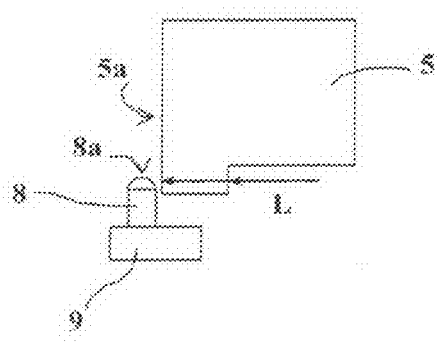
FIG. 4 is an enlarged detailed view showing how the limit stop cooperates with the rear face of a support, FIG. 5 partially shows another embodiment of a support for the sitting part.

FIG. 4 is a detailed view that shows the rounded end 8a of a limit stop 8 and its cooperation with the rear face 5a of a support 5. This Figure also shows that it is possible to reduce the length L of the support 5 at the limit stop 8. Thus, the latter will escape from the support 5 for a lower pivoting angle of the sitting part. This will result in the faster release of the seat's occupant.

Using appropriate tooling, it will be possible to reposition the sitting part in its folded position. The tooling will be designed to ensure an elastic deformation of supports 5 to enable a return behind the limit stop 8.

Figure 5:
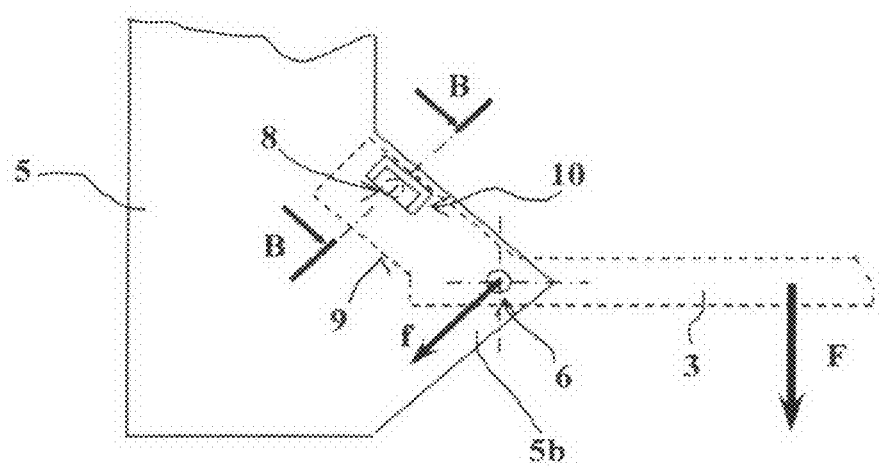
Figure 6:
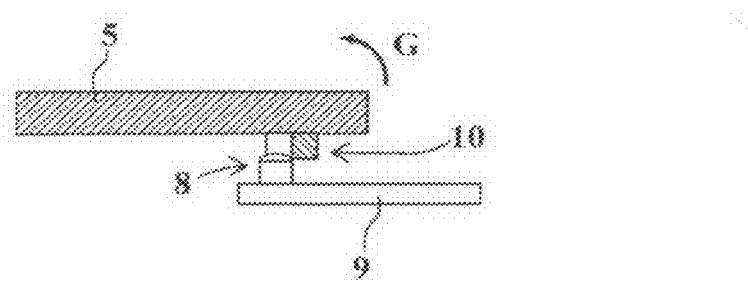
FIG. 6 is a partial section view of the previous Figure, such section being made along the plane referenced BB in FIG. 5.

FIGS. 5 and 6 show another embodiment of the invention.

FIG. 5 shows that each support 5 is made in the form of a metallic plate.

In this FIG. 5, the sitting part 3 and an arm 9 integral with the sitting part are shown in dotted lines.

We see that the support 5 incorporates a substantially triangular extension 5b onto which the pivot 6 for the sitting part is fastened. The stop surface is formed here by a U-shaped rim 10 fastened (for example by welding) to the face of the plate 5 facing the pivoting sitting part 3 as well as its arms 9.

FIG. 6 shows a partial section of the shape of the stop surface 10 against which the limit stop 8 presses.

When a load of a certain level F is exerted on the sitting part 3, this load is broken down at each plate 5 into loads f exerted on the pivots 6. These loads f (beyond a certain level) will cause the plates 5 to buckle, thereby causing a transversal deformation of the extensions 5b to the supports 5 (arrow G). These deformations G, combined with the load that is exerted by each limit stop 8 on its rim 10, will lead to the passage of the limit stops 8, thereby releasing the sitting part 3.

A single support 5 is shown here. There is naturally a second identical support 5 parallel to this one and also provided with an rim 10 cooperating with another limit stop.

The invention claimed is:

1. A seat for an armored vehicle, incorporating a back rest integral with a wall or the roof of the vehicle and a sitting part mounted able to pivot with respect to the back rest between a folded position in which it is substantially parallel to the back rest and an unfolded position where it is held by a limit stop and is substantially perpendicular to the back rest , such seat wherein the sitting part is connected to the back rest by linking means ensuring, in the event of a predetermined load, the release of the limit stop of the sitting part and its pivoting beyond the unfolded position, and wherein the sitting part is mounted able to pivot between two vertical supports, the linking means incorporating at least one protrusion forming a limit stop and cooperating with a stop surface integral with one of the supports, the profile of the protrusion, the stop surface, and the shape of the supports being selected so that the protrusion causes a deformation of the support when a predetermined load is exerted on the sitting part.

2. A seat according to claim 1, wherein the supports are metallic plates, the stop surface is a rim fitted to a face of the plate that is facing the pivoting sitting part.

3. A seat according to claim 2, wherein the plate includes a profile such that a load of a certain level exerted on the sitting part causes the plate to deform distancing the rim from the limit stop.

4. A seat according to claim 1, comprising two protrusions each one of said protrusions cooperating with only one stop surface integral with one vertical support.

* * * * *